United States Patent
Rutherford

(10) Patent No.: US 8,061,135 B2
(45) Date of Patent: *Nov. 22, 2011

(54) CONDENSATE EXTRACTOR FOR CHARGE AIR COOLER SYSTEMS

(75) Inventor: Thomas Porter Rutherford, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

This patent is subject to a terminal disclaimer.

(21) Appl. No.: 12/044,112

(22) Filed: Mar. 7, 2008

(65) Prior Publication Data

US 2009/0223493 A1  Sep. 10, 2009

(51) Int. Cl.
*F02B 29/04* (2006.01)
(52) U.S. Cl. .......................... 60/599; 123/563
(58) Field of Classification Search ............ 60/598–612; 123/559–565
See application file for complete search history.

(56) References Cited

U.S. PATENT DOCUMENTS

| | | | | |
|---|---|---|---|---|
| 4,563,983 A * | 1/1986 | Hayashi et al. | ............ | 123/41.21 |
| 6,301,887 B1 * | 10/2001 | Gorel et al. | ................... | 60/605.2 |
| 6,367,256 B1 * | 4/2002 | McKee | ......................... | 60/605.2 |
| 6,527,821 B2 * | 3/2003 | Liu et al. | ....................... | 55/385.3 |
| 6,598,396 B2 * | 7/2003 | Bailey | ........................... | 60/605.2 |
| 6,978,772 B1 * | 12/2005 | Dorn et al. | ................ | 123/568.12 |
| 7,669,417 B2 * | 3/2010 | Smith | .............................. | 60/599 |
| 7,980,076 B2 * | 7/2011 | Buia et al. | ........................ | 60/599 |
| 2010/0229549 A1 * | 9/2010 | Taylor | .............................. | 60/599 |

FOREIGN PATENT DOCUMENTS

| | | |
|---|---|---|
| DE | 28 14 593 A1 | 10/1979 |
| DE | 197 14 308 A1 | 10/1998 |
| DE | 102 38 839 A1 | 3/2004 |
| JP | 2005-226476 A | 8/2005 |

* cited by examiner

*Primary Examiner* — Thomas Denion
*Assistant Examiner* — Mary A Davis
(74) *Attorney, Agent, or Firm* — Quinn Law Group, PLLC

(57) ABSTRACT

A condensate extractor system for an internal combustion engine assembly with a charge air cooler system is provided. The condensate extractor system includes a hose member with a first end in direct fluid communication with the charge air cooler system, and a second end in direct fluid communication with the intake manifold of the engine air intake system. The hose member removes condensate from the charge air cooler system in a continuous manner in response to a pressure gradient created by the throttle body when the engine is in an on-state. The hose member defines an orifice configured to restrict the flow of air and condensate through the hose member. A filter is placed in direct fluid communication with the hose member, upstream from the orifice. The hose member is preferably characterized by a lack of fluid communication with a reservoir configured to collect condensate.

16 Claims, 1 Drawing Sheet

CONDENSATE EXTRACTOR FOR CHARGE AIR COOLER SYSTEMS

TECHNICAL FIELD

The present invention relates generally to internal combustion engines, and more specifically to internal combustion engine assemblies equipped with a supercharging device and a charge air cooler system.

BACKGROUND OF THE INVENTION

Internal combustion engines (ICE) are often called upon to generate considerable levels of power for prolonged periods of time on a dependable basis. Many such ICE assemblies employ a mechanical supercharging device, such as a turbocharger (or turbine driven, forced induction supercharger), to compress the airflow before it enters the intake manifold of the engine in order to increase power and efficiency. Specifically, a turbocharger is a gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

Under extreme operating conditions, the "supercharging" process may elevate the temperatures of the intake air to an extent that causes the formation of undesired exhaust by-products, such as various nitrogen oxides (NOx), and reduces the density of the air charge. To combat this problem, ICE manufacturers have historically employed a device most commonly known as an intercooler, but more appropriately identified as a charge-air-cooler (CAC) or aftercooler, to extract heat from the air exiting the supercharging device. A CAC is a heat exchange device used to cool the air charge and, thus, further improve volumetric efficiency of the ICE by increasing intake air charge density through isochoric cooling. A decrease in air intake temperature provides a denser intake charge to the engine and allows more air and fuel to be combusted per engine cycle, increasing the output of the engine.

The heat exchange process can cause moisture (water) to condense and, thus, form inside of the CAC system, especially when conducted in conditions where the ambient air flowing through the supercharging device and CAC is substantially humid (e.g., greater than 50% relative humidity). The condensation tends to accumulate downstream from the CAC, within the conduit through which the intake manifold receives the supercharged airflow. The liquefied condensation can be drawn into the intake manifold, entering the various cylinder combustion chambers. Depending upon the configuration of the CAC and supercharging devices, as well as their individual and relative packaging, the condensation may begin to puddle and enter the combustion chambers in large amounts, potentially causing the ICE to misfire, leading to premature engine wear, and creating a false-positive error signal triggering a service engine indicator light. In addition, accumulated water condensate that is not properly evacuated from the CAC can freeze and crack the CAC when ambient temperatures reach below freezing.

SUMMARY OF THE INVENTION

According to one embodiment of the present invention, an internal combustion engine assembly is provided. The internal combustion assembly has an air intake system including an intake manifold in downstream fluid communication with a throttle body. A charge air cooler system is in upstream fluid communication with the intake manifold and the throttle body. A hose member has a first end in direct fluid communication with the charge air cooler system, and a second end in direct fluid communication with the intake manifold. The hose member is configured to remove condensate from the charge air cooler system, preventing premature engine wear as well as prolonging the operational life expectancy of the charge air cooler system.

The hose member defines at least one orifice configured to restrict the flow of air and condensate through the hose member. This restriction prevents undesirable amounts of condensate and air from bypassing the throttle body and entering the intake manifold, thus maintaining good engine speed control. In addition, a filter may be placed in direct fluid communication with the hose member, in upstream fluid communication with the orifice. The filter helps prevent plugging of the orifice by minimizing or eliminating contaminate buildup.

The charge air cooler system is operatively attached to the internal combustion engine. Once the charge air cooler system is properly attached, the first end of the hose member is placed in direct fluid communication with the vertically lowest most portion of the charge air cooler system. In doing so, pooling or puddling of water condensation within the charge air cooler system is minimized or eliminated. In a similar regard, the hose member is oriented such that the first end is the vertically lowest most portion thereof. In this instance, pooling or puddling of water condensation within the condensate extractor system is minimized or eliminated. In addition, the charge air cooler system includes a first end tank in upstream fluid communication with a second end tank. To this regard, the first end of the hose member is in direct fluid communication with the second end tank.

The throttle body creates a pressure gradient when the internal combustion engine is in an on-state. The hose member removes condensate from the charge air cooler system in a continuous manner in response to the pressure gradient, spreading out water ingestion by the intake manifold, thereby preventing engine misfire. Ideally, the hose member is configured to maintain, for example, but not limited to, 2.5 ounces or less of condensate in the charge air cooler system. When in operation, the hose member introduces a first volume of air to the air intake system, whereas the charge air cooler system introduces a second volume of air to the air intake system. Notably, the first volume of air is substantially smaller than the second volume such that engine mass-airflow control is not affected.

The hose member is characterized by a lack of fluid communication with a reservoir or tank configured to collect condensate. As such, slosh and road camber phenomena associated with the use of reservoirs is eliminated. In a similar regard, the hose member is characterized by a lack of a direct fluid communication with the throttle body.

According to another embodiment of the present invention, an internal combustion engine assembly having an engine block is provided. The internal combustion engine assembly includes an exhaust manifold in fluid communication with the engine block to receive and expel exhaust gases therefrom. The internal combustion engine assembly also includes an air intake system with an intake manifold in downstream fluid communication with a throttle body. The throttle body creates a pressure gradient when the internal combustion engine is in an on-state.

The present embodiment also includes a turbocharger device, including a compressor blade rotatably disposed in a compressor housing, and configured for compressing airflow.

The compressor housing is in upstream fluid communication with the charge air cooler system for providing compressed air thereto. The turbocharger device also includes a turbine blade rotatably disposed in a turbine housing. The turbine blade is rigidly attached to the compressor blade for unitary rotation therewith. The turbine housing is in downstream fluid communication with the exhaust manifold to receive and redirect exhaust flow therefrom to spin the turbine blade.

Also included in the internal combustion engine assembly is a charge air cooler system in downstream fluid communication with the turbocharger device, and in upstream fluid communication with the air intake system. The charge air cooler system is configured to extract heat from compressed airflow exiting the turbocharger device.

A hose member has a first end in direct fluid communication with the charge air cooler system, and a second end in direct fluid communication with the intake manifold. The hose member removes condensate from the charge air cooler system in a continuous manner in response to the pressure gradient created by the intake manifold. The hose member also defines at least one orifice that is configured to restrict the flow of air and condensate through the hose member. A filter is in direct fluid communication with the hose member, and in upstream fluid communication with the orifice.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
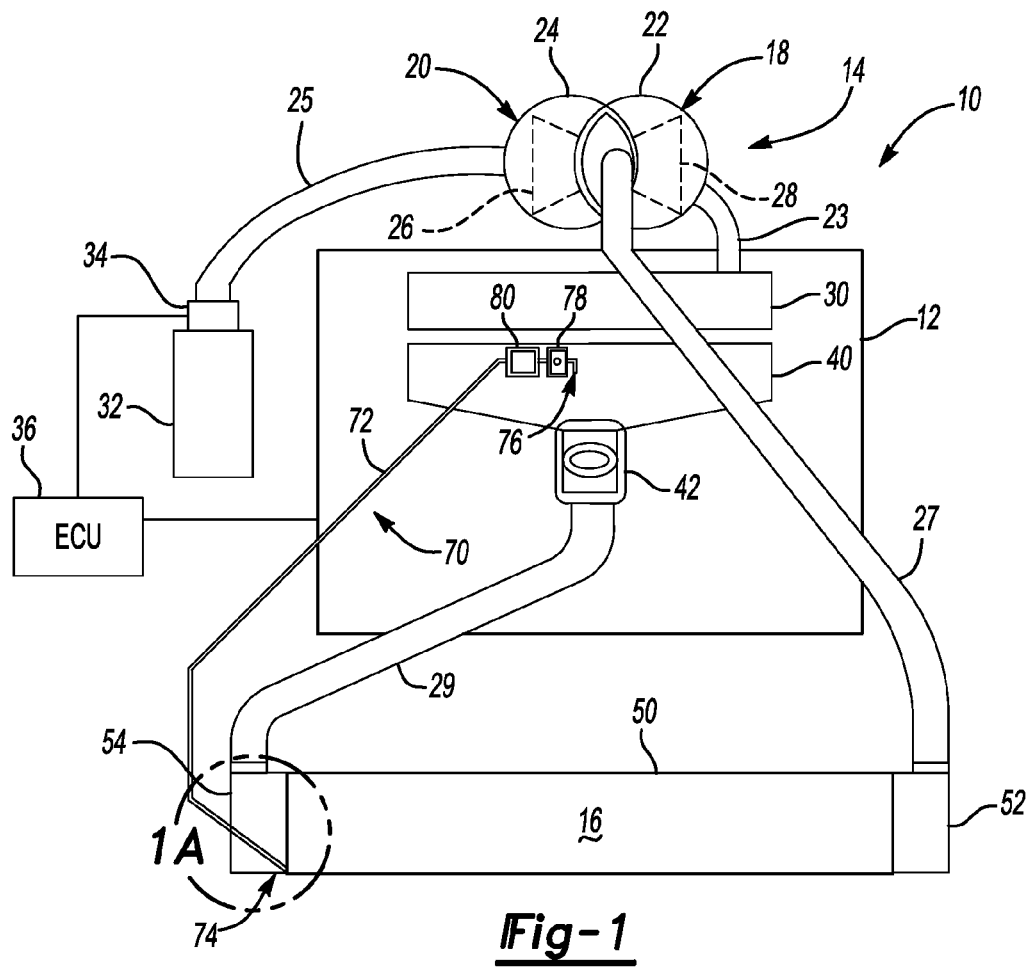
FIG. 1 is a schematic illustration of an internal combustion engine assembly equipped with a charge air cooler system having a condensate extractor system in accordance with the present invention in fluid communication therewith.
Figure 1A:
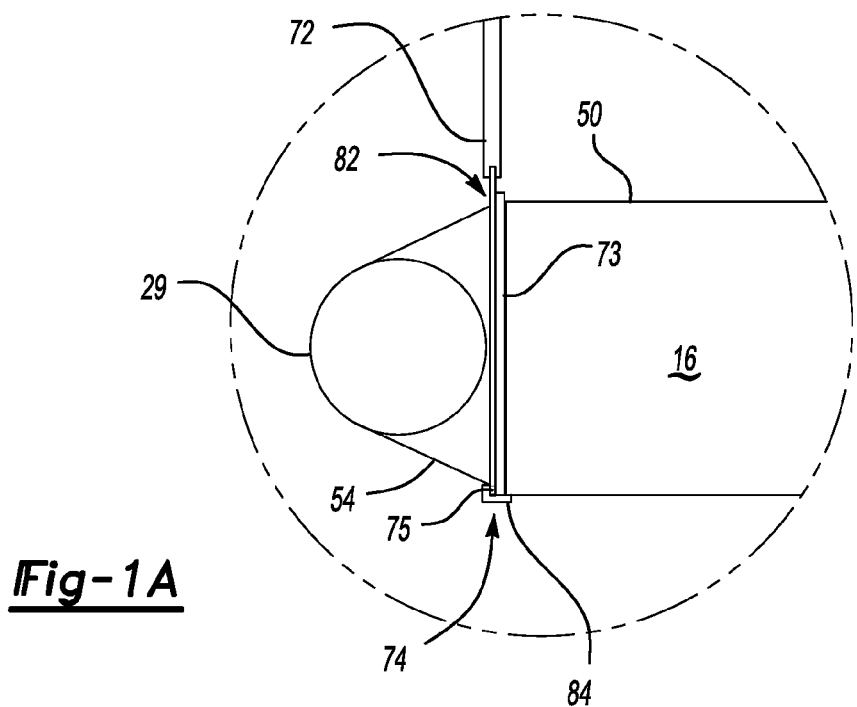
FIG. 1A is an enlarged schematic view of a portion of the charge air cooler system and condensate extractor system of FIG. 1.

Referring to the drawings, wherein like reference numbers refer to like components throughout the several views, FIG. 1 is a schematic illustration of a representative internal combustion engine assembly, identified generally as 10, with which the present invention may be utilized. It should be readily understood that FIG. 1 is merely an exemplary application by which the present invention may be practiced. As such, the present invention is by no means limited to the particular engine configuration of FIG. 1. In addition, the drawings presented herein, i.e., FIGS. 1 and 1A, are not to scale and are provided purely for instructional purposes. Thus, the specific and relative dimensions shown in the drawings are not to be considered limiting.

The internal combustion engine (ICE) assembly 10 for a motorized vehicle, such as, but not limited to, standard passenger cars, sport utility vehicles, light trucks, heavy duty vehicles, minivans, buses, tractors, etc., includes an engine block and cylinder head, indicated collectively at 12, equipped with a supercharging device, represented herein by a turbocharger device 14, and a charge air cooler (CAC) system 16. Notably, the engine block and cylinder head 12, turbocharger device 14, and CAC system 16 shown in FIG. 1 hereof have been greatly simplified, it being understood that further information regarding such systems may be found in the prior art. In addition, those skilled in the art will recognize that the engine block (or cylinder case) and cylinder head 12 may be integrally formed (as depicted in FIG. 1), or be pre-fabricated as individual components that are subsequently connected, e.g., by bolting or other fastening method. Finally, the ICE assembly 10 may operate in a compression ignited or spark ignited combustion mode within the scope of the invention claimed herein.

With continued reference to FIG. 1, the ICE assembly 10 includes an exhaust manifold 30 (or header) configured to receive and expel exhaust gases therefrom. For example, the cylinder block portion of the engine block and cylinder head 12 defines a plurality of exhaust ports (not shown) through which exhaust gases or products of combustion are selectively evacuated from a plurality of variable volume combustion chambers (not shown). The exhaust ports communicate the exhaust gases to the exhaust manifold 30, which is defined within the cylinder head portion of the engine block and cylinder head 12. The ICE assembly 10 also includes an air intake system, which is represented herein by an intake manifold 40 (or inlet manifold) in downstream fluid communication with a throttle body 42. The throttle body 42 is operable to control the amount of air flowing into the engine, normally in response to driver input. The intake manifold 40, on the other hand, is responsible for supplying the fuel/air mixture to the variable volume combustion chambers. The throttle body 42 creates a pressure gradient when the ICE assembly 10 is in an on-state.

The turbocharger device 14 is in fluid communication with the ICE assembly 10. More specifically, the turbocharger device 14 includes a turbine portion 18 and a compressor portion 20. The turbine portion 18 has a turbine housing 22, which is in fluid communication with the exhaust manifold 30 via exhaust line 23. The turbine housing 22 redirects the flowing exhaust stream to spin a turbine blade or impeller, shown hidden in FIG. 1 at 28, rotatably mounted therein. The compressor portion 20 has a compressor housing 24 with a compressor blade, shown hidden in FIG. 1 at 26, rotatably mounted therein. Inlet air is received by the compressor housing 24 from a clean air filter 32 via clean air duct 25. The turbine blade 28 is rigidly mounted to the compressor blade 26 for unitary rotation therewith. As the compressor blade 26 spins, air received from air filter 32 is compressed within the compressor housing 24. Air compressed by the compressor portion 20 is communicated by compressor output duct (or CAC inlet duct) 27 to the CAC system 16, the compressor housing 24 being in upstream fluid communication with the CAC system 16. Those skilled in the art will recognize that the present invention may incorporate a single turbocharger, twin turbochargers, staged turbochargers, or various other engine supercharging devices without departing from the intended scope of the present invention.

Still referring to FIG. 1 of the drawings, a mass airflow (MAF) sensor 34 is positioned between the clean air filter 32 and clean air duct 25. The MAF sensor 34 is used to determine the mass of air entering the ICE assembly 10—i.e., through the compressor portion 20 of turbocharger device 14, and communicate this information to an engine control unit (ECU) 36. The air mass information is necessary for the ECU 36 to calculate and deliver the correct fuel mass to the intake manifold 40.

The charge air output is routed from the compressor portion 20 of the turbocharger device 14 through the CAC (or aftercooler) system 16 before entering the intake manifold 40. To this regard, the CAC system 16 is positioned in downstream fluid communication with the turbocharger device 14, and in upstream fluid communication with the air intake system (i.e., air intake manifold 40 and throttle body 42). The CAC system 16 is configured to extract heat from compressed airflow (i.e., cool the air charge) exiting the turbocharger device 14. Although condensate buildup is a phenomena normally associated with air-to-air charge air cooler devices, the CAC system 16 may also be of the air-to-liquid type heat exchanger.

The CAC system 16 includes a heat exchange core assembly 50 with a first end tank 52 (also referred to herein as the "hot-end tank" or "upstream-end tank") operatively attached thereto. The upstream end tank 52 provides a transition to allow the intake air from the turbocharger device 14 to flow from the compressor output duct 27 into the inner cooling tubes (not shown) of the CAC system 16. The upstream end tank 52 is in upstream fluid communication with a second end tank 54 (also referred to herein as the "cold-end tank" or "downstream-end tank") operatively attached to an opposite end of the heat exchange core assembly 50. The downstream end tank 54 provides a transition to allow the intake air to flow from the tubes of the CAC system 16 to an induction duct 29, for transfer to the throttle body 42.

As seen in FIG. 1, the ICE assembly 10 employs a condensate extractor system 70 to remove water condensation from the CAC system 16, thereby preventing premature engine wear as well as prolonging the operational life expectancy of the CAC system 16. The condensate extractor system 70 includes a hose member 72 having first and second ends 74 and 76, respectively. The first end 74 of hose member 72 is in direct fluid communication with the CAC system 16, whereas the second end 76 is in direct fluid communication with the intake manifold 40. By attaching the hose member 72 in this manner, air mass is not added to or subtracted from the intake manifold 40 that has not been measured by the MAF sensor 34, which is important for the ECU 36 to calculate the correct amount of fuel to inject. This is necessary in order to regulate emissions and have the ICE assembly 10 run smoothly.

The hose member 72 defines at least one orifice 78 configured to restrict the flow of air and condensate through the hose member 72. Inclusion of the orifice 78 helps prevent undesirable amounts of water condensation and air from bypassing the throttle body 42 through the hose member 72, and entering the intake manifold 40, thus maintaining good engine speed control. For example, when the ICE assembly 10 is in operation, the hose member 72 introduces a first volume of air to the air intake system, whereas the CAC system introduces a second volume of air to the air intake system. The first volume of air introduced by the condensate extractor system 70 is substantially smaller than the second volume (i.e., negligible in comparison) such that control of the engine mass-air-flow is left unaffected. In addition, a filter 80 may placed in direct fluid communication with the hose member 72, in upstream fluid communication with the orifice 78. The filter 80 helps prevent plugging of the hose member 72 and orifice 78 by minimizing or eliminating contaminate buildup.

As noted above, the throttle body 42 creates a pressure gradient when the ICE assembly 10 is in an on-state. "Engine misfire" is a phenomena that may occur when a threshold volume of water condensation builds up inside of the CAC system 16, which is then ingested in undesirable volumes into the intake manifold 40 due to the higher "suction" pressure created by the intake manifold 40. The present invention systematically mitigates the condensate buildup, feeding it in negligible quantities to the intake manifold 40, so that it never reaches the threshold point. More specifically, the hose member 72 removes condensate from the CAC system 16 in a continuous and controlled manner in response to the pressure gradient, spreading out water ingestion by the intake manifold 40, thereby preventing engine misfire. Ideally, the hose member 72 is configured to maintain, for example, but not limited to, 2.5 ounces (oz) or less of condensate in the CAC system. For example the length and internal diameter of the hose member 72, as well as the size of the orifice 78, can be selectively modified to provide varying levels of condensate extraction—i.e., varying suction rates.

Many prior art condensate extractors employ a reservoir or tank configured to collect water condensation. However, accumulated condensate that is not properly evacuated from a charge air cooler can freeze when ambient temperatures reach below freezing, causing the charge air cooler to break down. In addition, reservoirs have a tendency to buildup excessive water which noticeably "slosh" during vehicle turns and acceleration. In addition, most reservoirs are functionally dependent upon gravity, and are thus operatively sensitive to variations in lateral road orientation—known as "road camber effect." The condensate extractor system 70 in accordance with the present invention, namely hose member 72, is characterized by a lack of fluid communication with a reservoir or tank configured to collect water condensation. By eliminating use of a reservoir or tank, slosh and road camber phenomena associated with the use of reservoirs is eliminated. In a similar regard, the hose member is characterized by a lack of a direct fluid communication with the throttle body to further militate against unwanted interruption of engine control by ECU 36.

FIG. 1A provides an enlarged schematic view of a portion of the CAC system 16 and condensate extractor system 70 of FIG. 1. A tubular portion 73 of the hose member 72 is passed through a braise or channel 82 formed in the downstream-end (or cold-end) tank 54 of the CAC system 16. According to preferred practice, the first end 74 of the hose member 72 is placed in direct fluid communication with the vertically lowest most portion of the CAC system 16. For example, as illustrated in FIG. 1A, the tubular portion 73 of the hose member 72 is passed through the channel 82 until it abuts or sits against a locator 84, which is placed immediately adjacent a bottom surface of the CAC system heat exchange core assembly 50. The vertically lowest actual point of the CAC system 16, downstream from the heat exchange core 50 (e.g., the cold-end tank 54) is where water condensation tends to naturally build up through gravity and airflow. By placing the first end 74 of the hose member 72 in direct fluid communication (e.g., with cross-drilled hole 75) with the vertically lowest point of the CAC downstream-end tank 54, pooling or puddling of water condensation within the charge air cooler system 16 is minimized or eliminated. In a similar regard, the hose member 72 is oriented such that the first end 74 is the vertically lowest most portion thereof. By packaging the hose member 72 in this manner, pooling or puddling of water condensation within the condensate extractor system 70 is minimized or eliminated.

While the best modes for carrying out the present invention have been described in detail, those familiar with the art to which this invention relates will recognize various alternative designs and embodiments for practicing the invention within the scope of the appended claims.

The invention claimed is:

1. An internal combustion engine assembly, comprising:
   an air intake system including an intake manifold in downstream fluid communication with a throttle body;
   a charge air cooler system in upstream fluid communication with the intake manifold and the throttle body; and
   a hose member having a first end directly connected to and in fluid communication with the charge air cooler system and a second end configured to bypass the throttle body and directly connected to and in fluid communication with the intake manifold, the hose member defining at least one orifice downstream of the first end, wherein the orifice is configured to restrict the flow of air and condensate through the hose member; and wherein the hose member is oriented such that the first end is the vertically lowest most portion thereof and is configured to remove condensate from the charge air cooler system.

2. The internal combustion engine assembly of claim 1, further comprising:

a filter incorporated into the hose member and in upstream fluid communication with the orifice.

3. The internal combustion engine assembly of claim 1, wherein the charge air cooler system is operatively attached to the internal combustion engine, and wherein the first end of the hose member is in direct fluid communication with a vertically lowest most portion of the charge air cooler system.

4. The internal combustion engine assembly of claim 3, wherein the charge air cooler system includes a first end tank in upstream fluid communication with a second end tank, wherein the first end of the hose member is in direct fluid communication with the second end tank.

5. The internal combustion engine assembly of claim 1, wherein the throttle body creates a pressure gradient when the internal combustion engine is in an on-state, wherein the hose member removes condensate from the charge air cooler system in a continuous manner in response to the pressure gradient.

6. The internal combustion engine assembly of claim 1, wherein the hose member is characterized by a lack of fluid communication with a reservoir or tank configured to collect condensate.

7. The internal combustion engine assembly of claim 1, wherein the hose member is configured to maintain approximately 2.5 ounces or less of condensate in the charge air cooler system.

8. The internal combustion engine assembly of claim 1, wherein the hose member introduces a first volume of air to the air intake system and the charge air cooler system introduces a second volume of air to the air intake system, wherein the first volume of air is substantially smaller than the second volume of air.

9. An internal combustion engine assembly, comprising:

an air intake system including an intake manifold in downstream fluid communication with a throttle body, the throttle body creating a pressure gradient when the internal combustion engine is in an on-state;

a supercharging device in fluid communication with the air intake system and configured to provide compressed airflow thereto;

a charge air cooler system in downstream fluid communication with the supercharging device and in upstream fluid communication with the air intake system, the charge air cooler system being configured to extract heat from compressed airflow exiting the supercharging device;

a hose member having a first end directly connected to and in fluid communication with the charge air cooler system and a second end directly connected to and in fluid communication with the intake manifold, the hose member removing condensate from the charge air cooler system in a continuous manner in response to the pressure gradient of the intake manifold, the hose member defining at least one orifice downstream of the first end, and the orifice configured to restrict the flow of air and condensate through the hose member; and a filter incorporated into the hose member and in upstream fluid communication with the orifice;

wherein the hose member is characterized by a lack of fluid communication with a reservoir or tank configured to collect condensate.

10. The internal combustion engine assembly of claim 9, wherein the charge air cooler system is operatively attached to the internal combustion engine, and wherein the first end of the hose member is in direct fluid communication with a vertically lowest most portion of the charge air cooler system.

11. The internal combustion engine assembly of claim 10, wherein the charge air cooler system includes a first end tank in upstream fluid communication with a second end tank, wherein the first end of the hose member is in direct fluid communication with the second end tank.

12. The internal combustion engine assembly of claim 9, wherein the hose member is configured to maintain approximately 2.5 ounces or less of condensate in the charge air cooler system.

13. The internal combustion engine assembly of claim 9, wherein the hose member introduces a first volume of air to the air intake system and the charge air cooler system introduces a second volume of air to the air intake system, wherein the first volume of air is substantially smaller than the second volume of air.

14. The internal combustion engine assembly of claim 9, wherein the supercharging device includes a compressor blade rotatably disposed in a compressor housing and configured for compressing airflow, the compressor housing being in upstream fluid communication with the charge air cooler system.

15. The internal combustion engine assembly of claim 14, wherein the supercharging device further includes a turbine blade rotatably disposed in a turbine housing, the turbine blade being rigidly attached to the compressor blade for unitary rotation therewith, the turbine housing being configured to redirect exhaust flow from the internal combustion engine to spin the turbine blade.

16. An internal combustion engine assembly having an engine block, comprising:

an exhaust manifold in fluid communication with the engine block to receive and expel exhaust gases therefrom;

an air intake system including an intake manifold in downstream fluid communication with a throttle body, the throttle body creating a pressure gradient when the internal combustion engine is in an on-state;

a turbocharger device, including:

a compressor blade rotatably disposed in a compressor housing and configured for compressing airflow, the compressor housing being in upstream fluid communication with the charge air cooler system; and a turbine blade rotatably disposed in a turbine housing, the turbine blade being rigidly attached to the compressor blade for unitary rotation therewith, the turbine housing being in downstream fluid communication with the exhaust manifold to redirect exhaust flow therefrom to spin the turbine blade;

a charge air cooler system in downstream fluid communication with the turbocharger device and in upstream fluid communication with the air intake system, the charge air cooler system being configured to extract heat from compressed airflow exiting the turbocharger device;

a hose member having a first end directly connected to and in fluid communication with the charge air cooler system and a second end configured to bypass the throttle body and directly connected to and in fluid communication with the intake manifold, the hose member removing condensate from the charge air cooler system in a continuous manner in response to the pressure gradient of the intake manifold, the hose member defining at least one orifice downstream of the first end, and the orifice configured to restrict the flow of air and condensate through the hose member; and a filter incorporated into the hose member and in upstream fluid communication with the orifice;

wherein the hose member is characterized by a lack of fluid communication with a reservoir or tank configured to collect condensate.

* * * * *